(12) United States Patent
Law

(10) Patent No.: US 9,952,017 B2
(45) Date of Patent: Apr. 24, 2018

(54) QUICK-ACCESS RIFLE COVER

(71) Applicant: Park Walter Law, Clarkston, WA (US)

(72) Inventor: Park Walter Law, Clarkston, WA (US)

( * ) Notice: Subject to any disclaimer, the term of this patent is extended or adjusted under 35 U.S.C. 154(b) by 0 days.

(21) Appl. No.: 15/376,951

(22) Filed: Dec. 13, 2016

(65) Prior Publication Data
US 2017/0167820 A1 Jun. 15, 2017

Related U.S. Application Data

(60) Provisional application No. 62/267,887, filed on Dec. 15, 2015.

(51) Int. Cl.
*F41C 33/06* (2006.01)
*B60R 7/14* (2006.01)

(52) U.S. Cl.
CPC ............. *F41C 33/06* (2013.01); *B60R 7/14* (2013.01)

(58) Field of Classification Search
CPC .......... F41A 35/02; F41A 23/26; F41A 23/28; F41C 33/06; B60R 7/14
USPC ....................................... 224/401
See application file for complete search history.

(56) References Cited

U.S. PATENT DOCUMENTS

| | | | | |
|---|---|---|---|---|
| 5,706,990 | A * | 1/1998 | Lahrson | B60R 9/08 211/64 |
| 6,634,530 | B1 * | 10/2003 | Black | B60R 7/14 206/317 |
| 2004/0251288 | A1 * | 12/2004 | Hancock | B60R 7/14 224/401 |
| 2011/0114687 | A1 * | 5/2011 | Wellborn | B60R 7/14 224/401 |
| 2011/0272445 | A1 * | 11/2011 | Bond | B62J 9/001 224/413 |
| 2012/0000949 | A1 * | 1/2012 | Williams, Jr. | B60R 7/14 224/401 |
| 2012/0091178 | A1 * | 4/2012 | Hancock | B60R 9/08 224/401 |
| 2013/0020330 | A1 * | 1/2013 | Luft | A47J 47/02 220/523 |
| 2013/0284780 | A1 * | 10/2013 | Beckwith | B60R 7/14 224/401 |
| 2014/0097222 | A1 * | 4/2014 | Robinson | B60R 7/14 224/401 |

* cited by examiner

*Primary Examiner* — Peter Helvey
(74) *Attorney, Agent, or Firm* — Romney J. Hogaboam

(57) ABSTRACT

A vehicle-mounted cover which keeps a firearm dry, protects the muzzle from debris, and permits quick access.

13 Claims, 7 Drawing Sheets

QUICK-ACCESS RIFLE COVER

CROSS-REFERENCE TO RELATED APPLICATIONS

This application claims priority to provisional application 62/267,887 filed on Dec. 15, 2015.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

STATEMENT REGARDING PRIOR DISCLOSURES BY AN INVENTOR OR JOINT INVENTOR

Not Applicable

BACKGROUND OF THE INVENTION

This invention relates generally to apparatuses for protecting firearms which are stored in a secure, yet readily available, location inside or on a vehicle. With further specificity, this invention is a gun cover which lends itself to being used on a variety of vehicles, and which is configured to provide protection to a firearm from above and below while simultaneously permitting rapid access by a vehicle operator.

Many people use all-terrain vehicles when they hunt or for other recreational activities. All-terrain vehicles can allow hunters to travel greater distances and transport game more quickly than they could on foot. They are also an enjoyable way to travel into areas where people frequently desire to have firearms readily accessible. It is important to secure and transport firearms in a way which protects people, firearms, and vehicles. If a firearm comes loose, it may strike the person operating or riding in the vehicle causing personal injury. If a firearm comes loose, it may fall to the ground and be damaged and firearms can have substantial monetary and/or sentimental value. If a firearm comes loose, it may scrape the vehicle or worse. If a firearm comes loose and strikes something with adequate force, it may also cause the firearm to discharge.

Depending on how a firearm is stored, the firearm may be damaged even without coming loose. One common way of storing firearms is to place them in open-top forks. The has the advantage of keeping the firearm quickly accessible, but does not provide a high degree of security against the firearm coming loose. Sometimes theses forks have retention means to better prevent firearms from coming loose. However, the retention means can significantly slow access to the firearm. They also may not provide any protection from branches or other cargo striking the firearm or optic. Further, without a cover, firearms may get wet when it rains or dew may collect on a firearm under certain conditions.

Particularly when hunting, it can be desirable to have ready access to one's firearm. Game may be available for only a short time, particularly when they hear and smell a person approach on a vehicle. Many popular firearm holders favor quick access over secure retention.

All-terrain vehicles are frequently configured, either from the factory, or as an add-on feature, with a front storage rack on the vehicle to permit items to be placed, secured, and transported on the vehicle. The rack is generally installed approximately level to the ground to reduce the likelihood and frequency with which items slide off the rack. When all-terrain vehicles are used for hunting, it is common for "U-shaped" (U.S. Pat. No. 5,915,572 A herein incorporated by reference) or "Y-shaped" (US D476,290 S herein incorporated by reference) forks to be installed on the rack to provide a convenient location to store a firearm and have it quickly available when needed. There is substantial variation in the configuration of and attachment mechanisms for forks but they are generally used as a pair. These forks frequently maintain the firearm with the bore of the barrel approximately level, the muzzle pointing to the left or right of the vehicle, and the scope and/or sights above the barrel. This is a relatively stable resting position for many firearms, particularly bolt-action firearms, since the weight of the stock, in conjunction with its distance from the barrel axis, causes many rifles to right themselves when supported near the barrel.

The length of rifles vary, but bolt-action rifles used for hunting frequently have barrels with lengths from 16 to 24 inches, a length of pull from 12 to 14 inches, and when the length of the action is added, overall lengths ranging from 35 to 45 inches. The height of rifles also vary, particularly when a scope is installed, but a scope can extend about 4 inches above the barrel.

BRIEF SUMMARY OF THE INVENTION

The invention is a hard cover configured used to protect a firearm on the front of an all-terrain vehicle. The invention has a front piece and a top piece connected with one or more hinges. The front piece is configured to attach to features on the vehicle, particularly a front storage rack. The front piece extends around a portion of the bottom, back, and end to prevent debris from being thrown onto the barrel of a rifle when the vehicle is operated in reverse and turned. The top piece covers the rifle without touching it.

DETAILED DESCRIPTION OF THE INVENTION

Figure 1:
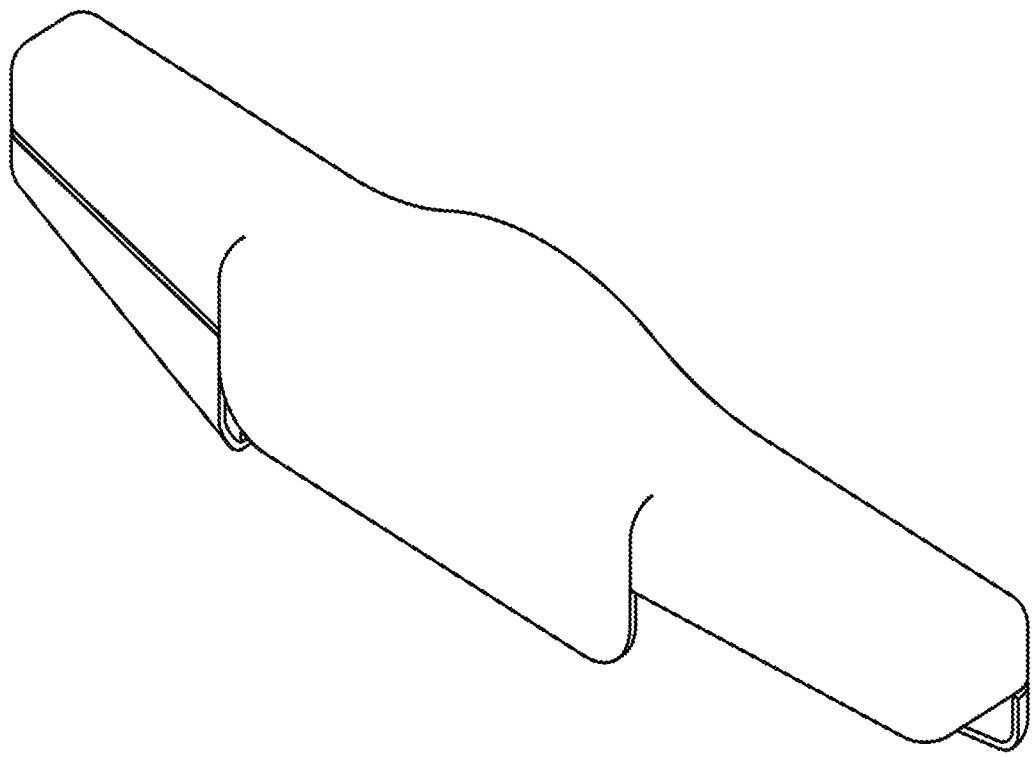
FIG. 1 shows an isometric view of the invention with the top in the closed position. The top is primarily visible. At the left of the figure, a portion of the front which covers a portion of the bottom is visible. At the center on the top, a raised portion configured to provide clearance for a rifle scope is shown.
Figure 2:
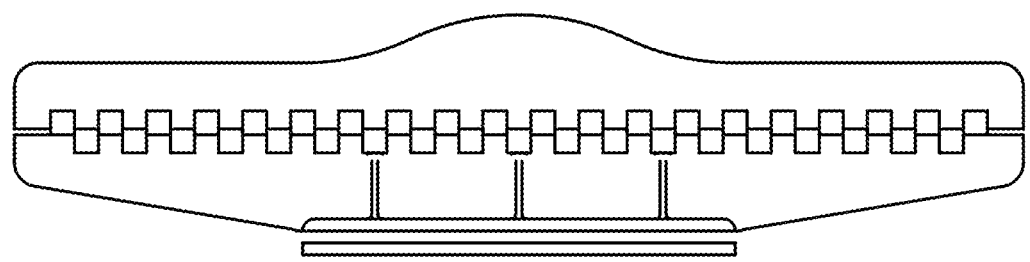
FIG. 2 shows a front view of the invention with the top in the closed position. In the middle of the figure, a hinge connecting the top and front portions is shown. Above the hinge the top portion is shown. Below the hinge the front portion is shown. Below the front member, a clamping member which is used to connect the front member to an all-terrain vehicle is shown.
Figure 3:
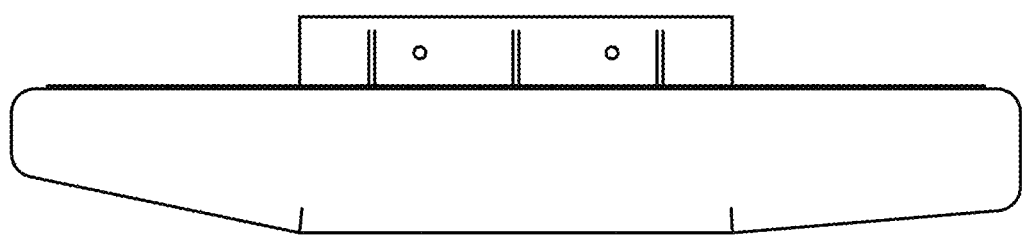
FIG. 3 shows a top view of the invention. At the top of the figure is shown a flat portion connected to the front member which is configured to attach the front member to an all-terrain vehicle.
Figure 4:
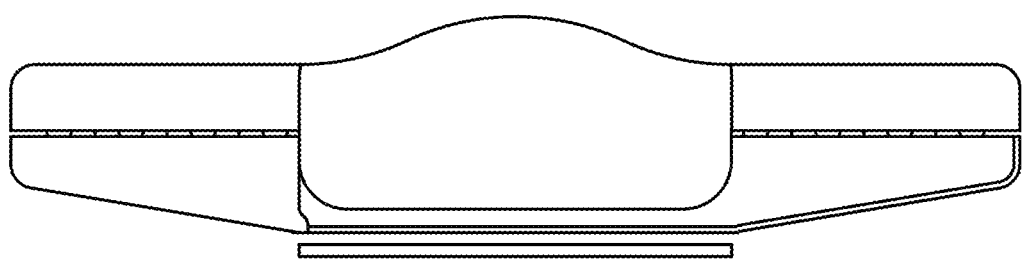
FIG. 4 shows a rear view of the invention with the top in the closed position. The hinge connecting the front and top members is partially visible. At the left of the figure, a portion of the front member which extends around a portion of the bottom and back of the device is shown.
Figure 5:
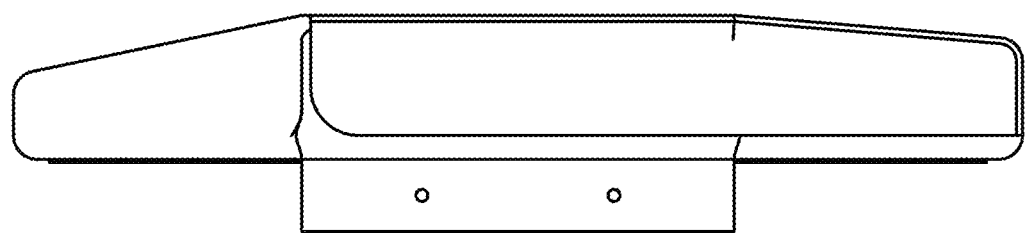
FIG. 5 shows a bottom view of the invention with the top in the closed position. At the left of the figure, a portion of the front member which extends around a portion of the bottom and back of the device is shown invention in the open position. At the bottom of the figure the clamping member is shown with holes which align with holes in the flat portion of the front member.
Figure 6:
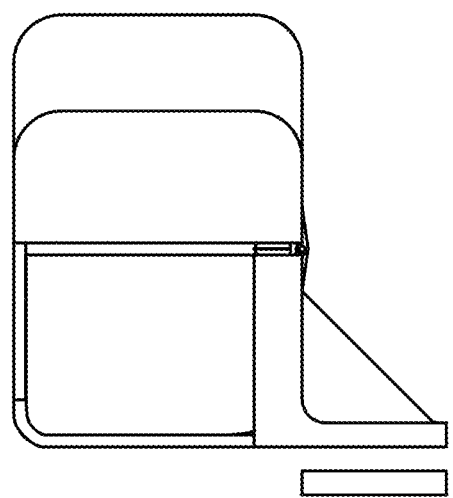
FIG. 6 shows a right view of the invention with the top in the closed position. At the bottom right of the figure the clamping member is shown with holes which align with holes in the flat portion of the front member. At the bottom left of the figure, through the open right end of the device, the portion of the front member extending around the bottom, back, and end if the device is shown.
Figure 7:
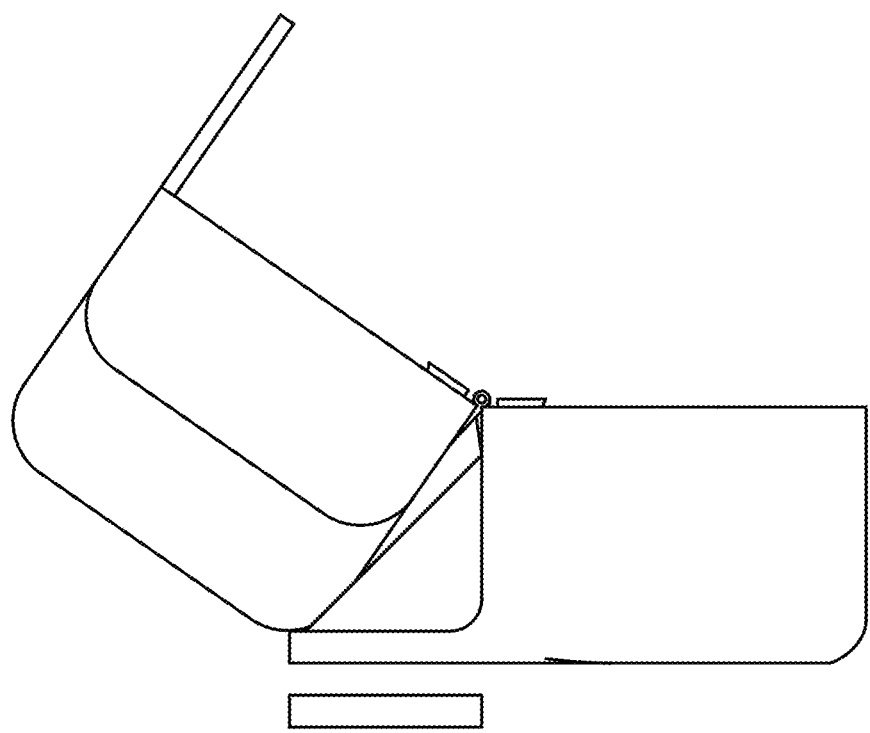
FIG. 7 shows a left view of the invention with the top in the open position. At the bottom of the figure the clamping member is shown with holes which align with holes in the flat portion of the front member.

The invention is a rigid, hinged cover with a substantially open bottom configured to protect a firearm secured on four wheeled all-terrain vehicle without touching the firearm. The invention comprises one or more mechanisms configured for attachment to a vehicle. In a preferred embodiment, the attachment mechanism is a flat member attached to the front member having one or more holes, a separate member having one or more holes configured to align with one or more holes in the flat member attached to the front member. The separate member is compressed toward the front member by tightening a threaded member which passes through the front and separate member. In an alternative embodiment, the invention further comprises one or more mechanisms configured for attachment to one or more firearm supports. The invention further comprises one or more hinges which connect the front member to the top member.

The cover is sufficiently larger than the firearm it protects to permit the cover to pivot open on the hinge(s) to expose a firearm resting in the supports without contacting the firearm. In one embodiment, the cover extends around the area configured for the firearm on at least one end. In an alternative embodiment, the attachment mechanism extends to at least one end and extends around the area configured for the firearm.

The hinges may be basic hinges permitting unencumbered opening and closing. Other types of hinges, including but not limited to self-closing hinges with a stay mechanism, are anticipated in alternative embodiments. The top and front members may be configured with members which allow the top to close a certain amount and no more.

The invention claimed is:

1. A device for protecting a cross-wise mounted firearm on the front of an all-terrain vehicle comprising:
    a) a substantially non-permeable front member wherein, said front member comprises a means for attaching said front member to an all-terrain vehicle,
    b) a bottom region disposed below an area configured to retain a firearm wherein,
    said front member extends around a portion of the bottom region on at least one end,
    c) a substantially non-permeable top member wherein,
        i) said top member is connected to said front member with one or more hinges,
        ii) said top member extends around a back side opposite said front member when closed,
    d) and neither said front member nor said top member touches a firearm around which said front and top members are configured to protect when either open or closed.

2. The device of claim 1 wherein the portion of the bottom region covered does not exceed one half of the length of the bottom region.

3. The device of claim 2 wherein said front member extends around a portion of a side opposite the front on at least one end.

4. The device of claim 3 wherein said front member extends around a portion of at least one end.

5. The device of claim 4 wherein said front member extends around a portion of at least one end on the same end as said front member extends around a portion of a side opposite the front and the same end as said front member extends around a portion of the bottom region.

6. The device of claim 5 wherein said top member extends around at least one end.

7. The device of claim 6 wherein said front member and said top member are configured to cooperatively interact such that a portion of the top member rests on a portion of the front member when closed preventing the top member from closing further than a pre-defined amount.

8. The device of claim 7 wherein said means for attaching said front member to a vehicle comprises one or more holes substantially horizontal to said front member in a surface substantially perpendicular to said front member.

9. The device of claim 8 wherein said means for attaching said front member to a vehicle further comprise a clamping member with one or more holes configured to permit the passage of a one or more threaded members wherein said one or more holes in said clamping member are configured to align with said holes in said front member.

10. The device of claim 9 wherein said means for attaching said front member to a vehicle further comprise:
    a) one or more members having threads on the exterior configured to pass through said holes in said front member and said clamping member,
    b) one or more members having threads on the interior configured to cooperatively couple with said members having threads on the exterior,
    c) and which draw together said front member and said clamping member when tightened.

11. The device of claim 10 wherein said one or more members having threads on the exterior are attached to said clamping member.

12. The device of claim 10 wherein said one or more hinges connecting said front member to said top member are piano hinges.

13. The device of claim 10 wherein the hinge connecting said front member to said top member is a self-closing hinge with a stay mechanism.

* * * * *